United States Patent

Schade

[11] Patent Number: 5,912,294
[45] Date of Patent: Jun. 15, 1999

[54] AQUEOUS POLYMER EMULSION, PROCESSES OF MAKING SAID AQUEOUS POLYMER EMULSION AND METHODS OF USING SAID AQUEOUS POLYMER EMULSION

[75] Inventor: Christian Schade, Ludwigshafen, Germany

[73] Assignee: BASF Aktiengesellschaft, Ludwigshafen, Germany

[21] Appl. No.: 08/626,779

[22] Filed: Apr. 2, 1996

[30] Foreign Application Priority Data

Apr. 6, 1995 [DE] Germany .......................... 195 12 882

[51] Int. Cl.$^6$ ...................................................... C08J 3/02
[52] U.S. Cl. .......................... 524/501; 523/340; 524/555; 524/556; 524/773; 524/813; 524/819; 524/820; 524/823; 524/824; 524/831; 524/832; 524/833
[58] Field of Search ...................................... 524/773, 813, 524/831, 833, 556, 555, 819, 823, 824, 832, 501, 820; 523/340

[56] References Cited

U.S. PATENT DOCUMENTS

| | | | |
|---|---|---|---|
| 4,013,604 | 3/1977 | Teer et al. ................................. | 524/773 |
| 4,076,920 | 2/1978 | Mikofalvy et al. ......................... | 526/74 |
| 4,090,991 | 5/1978 | Fukusaki et al. .......................... | 524/773 |
| 4,138,380 | 2/1979 | Barabas et al. ........................ | 524/833 X |
| 4,138,381 | 2/1979 | Chang et al. ........................... | 524/833 X |
| 4,268,641 | 5/1981 | Koenig et al. ......................... | 524/833 X |
| 4,289,667 | 9/1981 | Bush ......................................... | 524/773 |
| 4,384,096 | 5/1983 | Sonnabend ................................. | 526/313 |
| 4,421,902 | 12/1983 | Chang et al. ............................. | 526/317 |
| 4,423,199 | 12/1983 | Chang et al. .......................... | 526/307.6 |
| 4,429,097 | 1/1984 | Chang et al. ............................. | 526/317 |
| 4,574,130 | 3/1986 | Potter et al. .......................... | 524/833 X |
| 5,037,877 | 8/1991 | Kerherve .............................. | 524/833 X |
| 5,122,568 | 6/1992 | de Pierne et al. .................... | 524/833 X |
| 5,130,369 | 7/1992 | Hughes et al. ....................... | 524/833 X |
| 5,324,765 | 6/1994 | Mondet et al. ........................ | 524/831 X |
| 5,358,988 | 10/1994 | Schieferstein et al. ................. | 524/280 |
| 5,367,018 | 11/1994 | Floyd et al. ............................ | 524/773 |
| 5,416,158 | 5/1995 | Snathanam et al. ..................... | 524/773 |

FOREIGN PATENT DOCUMENTS

| | | |
|---|---|---|
| 0 190 892 | 8/1986 | European Pat. Off. . |
| 0 529 695 | 3/1993 | European Pat. Off. . |
| 1 164 095 | 4/1967 | Germany . |
| 1 257 752 | 8/1968 | Germany . |
| 1 258 721 | 8/1968 | Germany . |
| 15 46 315 | 4/1970 | Germany . |
| 1 264 945 | 5/1974 | Germany . |

*Primary Examiner*—Judy M. Reddick
*Attorney, Agent, or Firm*—Oblon, Spivak, McClelland, Maier & Neustadt, P.C.

[57] ABSTRACT

Aqueous polymer emulsions are obtained by polymerizing a mixture of hydrophobic and hydrophilic ethylenically unsaturated monomers by the free radical aqueous emulsion polymerization method and using, as the dispersing medium, a mixture of water and an organic solvent which is not completely soluble in water, the amount of solvent accounting for more than 20% by weight of the total amount of monomers to be polymerized.

29 Claims, No Drawings

AQUEOUS POLYMER EMULSION, PROCESSES OF MAKING SAID AQUEOUS POLYMER EMULSION AND METHODS OF USING SAID AQUEOUS POLYMER EMULSION

The present invention relates to aqueous polymer emulsions which are obtainable by polymerizing a mixture of monomers, which have at least one ethylenically unsaturated group and are capable of free radical polymerization, by the free radical aqueous emulsion polymerization method, with the proviso that a) the monomer mixture comprises from 30 to 90% by weight, based on the mixture, of monomers whose solubility in water at the chosen polymerization temperature and at the chosen polymerization pressure is ≦5% by weight, based on the amount of water (monomers a), b) the monomer mixture comprising from 10 to 70% by weight, based on the mixture, of monomers whose solubility in water at the chosen polymerization temperature and at the chosen polymerization pressure is <5% by weight, based on the amount of water (monomers b) and c) at least a part of the free radical aqueous emulsion polymerizaton is carried out in a dispersing medium which, in addition to water, comprises an organic solvent whose solubility in water at the chosen polymerization temperature and at the chosen polymerization pressure is ≦10% by weight, based on the amount of water, the amount of the organic solvent being such that, on the one hand, it is sufficient to form a solvent phase in addition to the aqueous phase and, on the other hand, is at least >20% by weight, based on the total amount of monomers to be polymerized, but at the same time does not exceed twice the mass of water contained in the dispersing medium.

The present invention furthermore relates to processes for the preparation of such aqueous polymer emulsions and to the use thereof as thickeners or binders.

Aqueous polymer emulsions are fluid systems which contain, as the disperse phase in an aqueous dispersing medium, polymer particles in stable disperse distribution. The diameter of the polymer particles is in general mainly from 0.01 to 5 μm, frequently mainly from 0.01 to 1 μm.

The disperse distribution is often stable over a period of ≧1 month, often even over a period ≧3 months. The polymer volume concentration of aqueous polymer emulsions is as a rule from 10 to 70% by volume, based on the total volume of the aqueous polymer emulsion.

As in the case of polymer solutions when the solvent is evaporated, on evaporation of the aqueous dispersing medium aqueous polymer emulsions have the property of forming polymer films and are therefore widely used as binders, for example for surface coatings or materials for coating leather.

A further noteworthy property of aqueous polymer emulsions is the fact that their dynamic viscosity is lower than that of polymer solutions having the same polymer content. Aqueous emulsions of polymers which contain an increased amount of hydrophilic monomers, for example α,β-monoethylenically unsaturated carboxylic acids of 3 to 6 carbon atoms, as polymerized units are therefore advantageously used as thickener emulsions, ie. the polymer is produced in an acidic aqueous medium in a disperse distribution which results in a relatively low dynamic viscosity. The user can then convert these low-viscosity aqueous polymer emulsions into highly viscous aqueous solutions which have a thickening effect, by increasing the pH (cf. for example German Patents 1,164,095, 1,264,945, 1,258,721, 1,546,315 and 1,257,752). Frequently, the dispersed polymer of such aqueous thickener emulsions additionally contains surfactant monomers as further hydrophilic monomers in the form of polymerized units. The term surfactant monomers is understood here as meaning amphiphilic surfactants which have at least one ethylenically unsaturated group and are obtainable by an addition reaction of an alkylene oxide (which as a rule is of 2 and/or 3 to 8 carbon atoms), in particular ethylene oxide and/or propylene oxide, with suitable compounds having at least one ethylenically unsaturated group and mobile protons (acidic Bronsted hydrogen). Protons having such mobility are possessed, for example, by hydroxyl or carboxyl groups. The abovementioned surfactant monomers may also be considered as condensates of oligoalkylene glycol ethers and compounds containing mobile protons and having at least one ethylenically unsaturated bond. Further surfactant monomers may be considered as adducts of oligoalkylene glycol ethers with compounds having at least one ethylenically unsaturated bond and an isocyanate group. Usually, the surfactant monomers have at least one hydrophobic radical in addition to the one or more hydrophilic polyether groups, and the resulting interplay produces the surfactant character.

The hydrophilic polyether group is usually responsible for the solubility of the surfactant monomers in water, whereas the hydrophobic radicals tend to form associates, with the result that a thickening effect may be obtained.

In principle, a person skilled in the art divides the aqueous polymer emulsions into aqueous secondary and aqueous primary emulsions. The aqueous secondary emulsions are those in the preparation of which the polymer is produced outside the aqueous dispersing medium, for example in solution in a suitable nonaqueous solvent. This solution is then transferred to the aqueous dispersing medium, and the solvent is separated off, as a rule by distillation, with dispersing.

Accordingly, aqueous primary emulsions are those in which the polymer is produced from monomers having at least one ethylenically unsaturated group by the free radical aqueous emulsion polymerization method, directly in disperse distribution in the aqueous dispersing medium itself.

The latter method has been described in many publications and is sufficiently well known to a person skilled in the art (cf. for example Encyclopedia of Polymer Science and Engineering, 8 (1987), 659 et seq.; D. C. Blackly in High polymer Latices, 1 (1966), 35 et seq.; H. Warson, The Applications of Synthetic Resin Emulsions, page 246 et seq., Chapter 5 (1972); D. Diederich, Chemie zu unserer Zeit 24 (1990), 135–142; Emulsion Polymerization, Interscience Publishers, New York (1965); DE-A 40 03 422 and Dispersionen synthetischer Hochpolymere, F. Hölscher, Springer Verlag, Berlin (1969)).

In contrast to the other free radical polymerization methods, the significant advantage of free radical aqueous emulsion polymerization is that it leads to polymers having a particularly high molecular weight (cf. for example High Polymers, Vol. IX, Emulsion Polymerisation, Interscience Publishers, Inc., New York (1965), pages 15/16), which is advantageous, for example, in the case of thickener emulsions, since, for a given monomer composition, a high molecular weight generally promotes the thickening effect.

However, a disadvantage of the known method of free radical aqueous emulsion polymerization of mixtures of monomers having at least one ethylenically unsaturated group is that, with increasing amount of hydrophilic monomers (monomers having high water solubility) in the monomer mixture to be polymerized, the magnitude of the resulting molecular weight is no longer satisactory.

A further disadvantage is that, with increasing amount of hydrophilic monomers in the monomer mixture to be polymerized, the free radical aqueous emulsion polymerization process often cannot be carried out completely successfully, ie. an aqueous polymer emulsion having a high coagulum content or, instead of a stable aqueous polymer emulsion, a coagulating system is frequently obtained.

It is an object of the present invention to provide aqueous emulsions of polymers which have a high content of hydrophilic monomers as polymerized units and a high molecular weight and a high stability. It is a further object of the present invention to provide processes for the preparation of such aqueous polymer emulsions.

We have found that these objects are achieved by the aqueous polymer emulsions defined at the outset.

It was possible to start from EP-A-190 892, this being the closest prior art. This laid-open application relates to aqueous polymer emulsions which are obtainable by polymerizing a monomer mixture comprising at least one $\alpha,\beta$-monoethylenically unsaturated surf actant monomer, at least one $\alpha,\beta$-monoethylenically unsaturated carboxylic acid and at least one nonionic ethylenically unsaturated monomer by the free radical aqueous emulsion polymerization method, with the proviso that at least a part of the free radical aqueous emulsion polymerization is carried out in a dispersing medium which, in addition to water, comprises an organic solvent having a reduced solubility in water. According to EP-A 190 892, such aqueous polymer emulsions were obtainable in a satisfactory manner. Furthermore, EP-A 190 892 discloses that the resulting aqueous polymer emulsions are suitable as aqueous thickener emulsions (an increase in pH results in a thickening effect) having a good thickening effect.

However, the disadvantage of EP-A 190 892 is that it attributes the good thickening effect of the products obtainable by its procedure to the fact that the presence of the organic solvent results in completely uniform incorporation of the surfactant monomers as polymerized units (cf. page 6, line 23, to page 7, line 10, of EP-A 190 892). EP-A 190 892 does not envisage a relationship with a high molecular weight of the emulsion polymers. Moreover, EP-A 190 892 limits the amount of the organic solvent to be concomitantly used to not more than 20% by weight, based on the total amount of the monomers to be polymerized (for example, page 3, line 27, of EP-A 190 892). According to EP-A 190 892, a higher solvent content causes a reduction in the thickening effect of the resulting emulsion polymer (EP-A 190 892, page 18, lines 1 to 5). U.S. Pat. No. 4,421,902, U.S. Pat. No. 4,423,199, U.S. Pat. No. 4,384,096 and U.S. Pat. No. 4,429,097) also form part of the prior art. However, the disadvantage of the prior art based on these publications is that the aqueous dispersing medium does not comprise an organic solvent.

Against this background, the achievement, according to the invention, of the object is surprising.

The water solubility of the organic solvent concomitantly to be used according to the invention at the chosen polymerization temperature and at the chosen polymerization pressure is preferably $\leq 8$ or $\leq 6$ or $\leq 4$ or $\leq 1\%$ by weight, based on the amount of water.

The amount of organic solvent concomitantly to be used according to the invention is, as a rule, not more than 500% by weight, based on the total amount of monomers to be polymerized.

The amount of organic solvent concomitantly to be used according to the invention is from 30 to 150, particularly preferably from 40 to 100, % by weight, on the same basis as above. According to the invention, the water content of the aqueous dispersing medium is, as a rule, 40 to 900, frequently from 40 to 500, % by weight. The solvent content is, as a rule, at least 5, usually $\leq 50$, preferably from 10 to 20, % by weight, based on the amount of the total dispersing medium.

Examples of suitable organic solvents concomitantly to be used according to the invention are chain-like (branched or straight-chain) or cyclic saturated hydrocarbons, such as propane, butane, pentane, hexane, heptane, octane, cyclopentane, cyclohexane, methylcyclohexane and liquid paraffins, aromatic hydrocarbons, such as benzene, toluene, xylene and isopropylbenzene, halohydrocarbons, such as methylene chloride, chlorobenzene or 1,1,1-trichloroethane, dialkyl ethers, such as tert-butyl methyl ether or isobutyl methyl ether, esters of $C_1$–$C_{20}$-alkanecarboxylic acids and monohydric $C_1$–$C_{20}$-alkanols, such as methyl formate, ethyl formate, propyl formate, methyl acetate, ethyl acetate, propyl acetate, butyl acetate, amyl acetate, methyl propionate, ethylhexyl ethylhexanoate, isopropyl palmitate or isopropyl myristate, ketones which have $\leq 5$ carbon atoms, such as diethyl ketone, and monohydric alkanols which have $\leq 3$ carbon atoms, such as n-butanol, n-pentanol, isopentanol, n-hexanol, cyclohexanol, isooctanol, n-octanol, isodecanol or n-dodecanol. Mixtures of the abovementioned solvents can of course also be used.

After the end of the novel free radical aqueous emulsion polymerization, the organic solvent concomitantly used is preferably separated from the resulting aqueous polymer emulsion. Preferably used organic solvents are therefore those whose boiling point at 1 atm is $\leq 150°$ C., particularly advantageously $\leq 100°$ C. Suitable methods for separating off the solvent are conventional distillation, steam distillation, stripping methods, adsorption methods, ultrafiltration or dialysis. The term solvent implies a chemical compound which is essentially inert with respect to the free radical aqueous emulsion polymerization.

Monomers a) are those whose solubility in water at the chosen polymerization temperature and at the chosen polymerization pressure is $\leq 5\%$ by weight, based on the amount of water, ie. if the 5% by weight of a monomer a) are stirred into water at the chosen polymerization temperature and at the chosen polymerization pressure in an appropriate manner, the result is the formation of an optically homogeneous transparent phase whose optically homogeneous effect is not due to identical refractive indices of monomers and water but is a consequence of the thorough mixing of the two substances.

Examples of suitable monomers a) are $\alpha,\beta$-monoethylenically unsaturated carboxylic acids, such as acrylic acid, methacrylic acid, itaconic acid, crotonic acid, fumaric acid, maleic acid, halfesters of maleic or fumaric acid such as monomethyl maleate, monomethyl fumarate, monoethyl maleate, monoethyl fumarate, monobutyl maleate and monobutyl fumarate, monoethylenically unsaturated compounds which have at least one phosphonic acid group or at least one sulfonic acid group, such as vinylphosphonic acid, sodium vinyl sulfonate, sodium styrenesulfonate or acrylamidopropanesulfonic acid, monoethylenically unsaturated compounds which have at least one sulfate ester group, such as potassium sulfatopropylmethacrylate or ammonium sulfatoethylmethacrylate, amides of $\alpha,\beta$-monoethylenically unsaturated carboxylic acids and derivatives thereof, such as acrylamide, methacrylamide, N,N- dimethylacrylamide, 3-acrylamido-3-methylbutyric acid, N,N-dimethylaminopropylacrylamide, N-methylol(meth) acrylamide, N,N-dimethyl-N-methacrylamidopropyl-N-(3-sulfopropyl)ammonium betaine or 10-acrylamidoundecanoic acid, hydroxy esters of acrylic or methacrylic acid and polyhydric alcohols, such as hydroxyethyl acrylate, hydroxyethyl methacrylate, hydroxypropyl acrylate, hydroxypropyl methacrylate or butanediol monoacrylate, as well as monomers such as monomethacroyloxyethyl phthalate, monomethacroyloxyethyl succinate, dimethylaminoethyl acrylate, dimethylaminoethyl methacrylate, diethylaminoethyl acrylate or diethylaminoethyl methacrylate, quaternized ammonium (meth)acrylates, such as N-trimethyl- and N-triethylammoniumethyl acrylate and N-trimethyl- or N-triethylammoniummethyl methacrylate, N-vinylpyrrolidone, N-vinylcaprolactam, N-vinylimidazole, N-$C_1$–$C_{10}$-alkyl-N'-vi-nylimidazolium compounds, such as N-methyl-, N-ethyl- or N-butyl-N'-vinylimidazolium chloride, bromide or methosulfate, 1-vinyl-2-methylvinylimidazole, 4- and 2-vinylpyridine and N-vinylform-amide.

Monomers a) which have acidic or basic groups may also be used in the form of their salts produced by neutralization with suitable acids or bases. Suitable bases for the purpose of neutralization are, for example, alkali metal hydroxides, ammonia or organic amines. Suitable neutralizing acids are mineral acids, such as sulfuric acid, hydrochloric acid or phosphoric acid, and organic acids of 1 to 4 carbon atoms, eg. formic acid, acetic acid, citric acid or tartaric acid.

Further suitable monomers a) are surfactant monomers. Examples of suitable monomers of this type are compounds of the general formula (I)

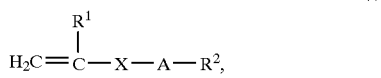

where $R^1$ is H or $CH_3$,
X is COO, CONH, COO—CH(OH)—$CH_2$, COO—$CH_2$—CH(OH), or $CH_2$,
A is $-(CH_2CHYO)_{\overline{n}}$, where Y is H, $CH_3$ or $C_2H_5$ and n is from 2 to 100 and
$R^2$ is H or $C_1$–$C_{30}$-alkyl.

In the compounds of the general formula I, n is preferably from 10 to 60.

Advantageous surfactant monomers are those of the general formula (II)

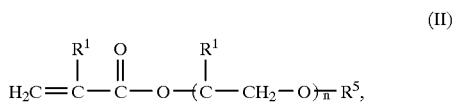

where $R^5$ is $C_{12}$–$C_{30}$-alkyl, $C_{12}$–$C_{30}$-aralkyl, $C_{12}$–$C_{30}$-alkylaryl or $C_{12}$–$C_{30}$-alkylaralkyl.

Other advantageous surfactant monomers are those of the general formula (III)

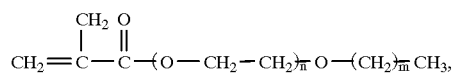

where m is from 13 to 21.

Particularly suitable surfactant monomers are those of U.S. Pat. No. 4,429,097, U.S. Pat. No. 4,384,096, U.S. Pat. No. 4,421,902, U.S. Pat. No. 4,423,199 and EP-A 190 892.

The amount of monomers a) is advantageously at least 40, frequently at least 50, % by weight, based on the total amount of monomers to be polymerized. However, it is usually $\leq 80$, frequently $\leq 70$, % by weight. Preferred monomers a) are those whose solubility in water at the chosen polymerization temperature and at the chosen polymerization pressure is $\leq 15$, preferably $\leq 30$, very particularly preferably $\leq 50$, % by weight.

Particularly preferred monomers a) are acrylic and methacrylic acid. Advantageously, at least 50, preferably at least 70, % by weight of the total amount of the monomers a) consist of acrylic and/or methacrylic acid. The remaining monomers a) are advantageously surfactant monomers. A very particularly preferred surfactant monomer is the methacrylate of stearyl polyglycol ether, having from 15 to 35 ethylene oxide units in the polyglycol ether group.

Surfactant monomers which do not meet the solubility requirement of the group of monomers a) (solubility in water $\leq 5\%$ by weight at the polymerization pressure and temperature) can be copolymerized as monomers b.

Further suitable monomers b) are styrene and its derivatives, such as α-methylstyrene, p-methylstyrene, p-chloromethylstyrene, p-butylstyrene, p-ethylstyrene or p-chlorostyrene, halogenated monoethylenically unsaturated compounds, such as vinyl chloride, vinylidene chloride or vinylidene fluoride, vinyl esters of straight-chain or branched alkanecarboxylic acids of 2 to 30, in particular 2 to 10, carbon atoms, such as vinyl acetate, vinyl propionate, vinyl laurate, vinyl neooctanoate, vinyl neononanoate or vinyl neodecanoate, conjugated polyunsaturated compounds, such as butadiene or isoprene, vinyl alkyl ethers whose alkyl radical is of 1 to 30 carbon atoms, such as vinyl octadecyl ether, as well as acrylonitrile, methacrylonitrile, 1-alkenes of 3 to 30 carbon atoms, N-alkylacrylamides or N-alkylmethacrylamides, whose alkyl groups in each case are of 4 to 30 carbon atoms, such as N-tert-butylacrylamide, N-tert-octylacrylamide or N-undecylmethacrylamide, esters of acrylic or methacrylic acid and alkanols of 1 to 25 carbon atoms, such as methyl acrylate, ethyl acrylate, n-butyl acrylate, isobutyl acrylate, tert-butyl acrylate, 2-ethylhexyl acrylate, lauryl acrylate, isobornyl acrylate, stearyl acrylate and the corresponding methacrylates, as well as phenoxyethyl acrylate, tetrahydrofurfuryl acrylate, tetrahydrofurfuryl methacrylate or perfluoroethyl acrylate.

Preferred monomers b) are styrene, vinyl esters of alkanecarboxylic acids of 2 to 30 carbon atoms and alkyl acrylates and methacrylates where the alkyl group has 1 to 10 carbon atoms or mixtures of these monomers. Very generally, preferred monomers b) are those whose solubility in water at the polymerization pressure and polymerization temperature is equal to or less than the corresponding solubility of methyl acrylate, preferably equal to or less than the corresponding solubility of ethyl acrylate.

Monomers which usually increase the internal strength of the films of the aqueous polymer emulsions, ie. crosslinking monomers, may be both monomers a) and monomers b). Usually, such monomers have at least one epoxy, hydroxyl, N-methylol or carbonyl group or at least two nonconjugated ethylenically unsaturated double bonds. These monomers are usually incorporated in an amount of $\leq 10$, preferably $\leq 5$, % by weight, based on the total amount of the monomers to be polymerized.

Examples of such monomers are divinylbenzene, divinylethyleneurea, diallyltartaramide, methylenebisacrylamide, esters of acrylic or methacrylic acid and polyhydric alcohols, such as ethylene glycol, 1,4-butanediol, trimethylolpropane, pentaerythritol, neopentylglycol, bisphenol A, glycerol or propanediol, having at least two ester units per molecule, allyl esters of acrylic or methacrylic acid, trivinylcyclohexane, triallyltriazinetrione, allyl ethers of trimethylolpropane, pentaerythritol and sucrose, having at least two allyl ether units per molecule, dihydrodicyclopentadienyl acrylate, dihydrodicyclopentadienyl methacrylate, N-allylmethacrylamide, or diallyl phthalate. Divinylbenzene, allyl esters of acrylic or methacrylic acid, 1,4-butanediol diacrylate and 1,4-butanediol dimethacrylate are particularly preferred.

In the novel process, the solubility of the monomers b) involved is usually such that the total amount of monomers b) involved in the novel process is not completely soluble in the aqueous part of the dispersing medium at the chosen polymerization temperature and at the chosen polymerization pressure.

Suitable free radical polymerization initiators for the novel process are all those which are capable of initiating free radical aqueous emulsion polymerizations under the action of light or heat. These may be both peroxides and azo compounds. Redox initiator systems are of course also suitable. They may be readily or sparingly soluble in water. Peroxodisulfuric acid and/or the alkali metal salts thereof and/or its ammonium salt are preferably used as free radical initiators. Hydrogen peroxide or tert-butyl hydroperoxide is also suitable. The amount of free radical polymerization initiators used is as a rule from 0.1 to 5% by weight, based on the total amount of the monomers to be polymerized. The novel free radical aqueous emulsion polymerization can of course also be initiated by ionizing radiation.

In the course of the novel free radical aqueous emulsion polymerization, dispersants which ensure the stability of the aqueous polymer emulsion produced are usually present. Suitable dispersants are both the protective colloids usually used for carrying out free radical aqueous emulsion polymerizations and emulsifiers.

Examples of suitable protective colloids are polyvinyl alcohols, cellulose derivatives and vinylpyrrolidone-containing copolymers. A detailed description of further suitable protective colloids appears in Houben-Weyl, Methoden der organischen Chemie, Volume XIV/1, Makromolekulare Stoffe, Georg-Thieme-Verlag, Stuttgart, 1961, pages 411 to 420. Mixtures of emulsifiers and/or protective colloids can of course also be used.

Preferably, exclusively emulsifiers whose relative molecular weight is preferably <1000 are used as dispersants. They may be anionic, cationic or nonionic. Where mixtures of surfactants are used, the individual components must of course be compatible with one another, which may be checked in case of doubt by means of a few preliminary experiments. In general, anionic emulsifiers are compatible with one another and with nonionic emulsifiers. The same also applies to cationic emulsifiers, whereas anionic and cationic emulsifiers are generally incompatible with one another. Conventional emulsifiers are alkali metal, ammonium and amine salts of fatty acids, ethoxylated mono-, di- and trialkylphenols (degree of ethoxylation: from 3 to 100, alkyl radical: $C_4$ to $C_{12}$), ethoxylated fatty alcohols (degree of ethoxylation: from 3 to 100, alkyl radical: $C_8$ to $C_{18}$) and alkali metal and ammonium salts of alkylsulfates (alkyl radical: $C_8$ to $C_{16}$), of sulfuric halfesters of ethoxylated alkanols (degree of ethoxylation: from 1 to 70, alkyl radical: $C_{12}$ to $C_{18}$) and ethoxylated alkylphenols (degree of ethoxylation: from 3 to 100, alkyl radical: $C_4$ to $C_{12}$), of alkanesulfonic acids (alkyl radical: $C_{12}$ to $C_{18}$) and of alkylarylsulfonic acids (alkyl radical: $C_9$ to $C_{18}$). Further suitable emulsifiers, such as sulfosuccinic esters, are described in Houben-Weyl, Methoden der organischen Chemie, Volume XIV/1, Makromolekulare Stoffe, Georg-Thieme-Verlag, Stuttgart, 1961, pages 192 to 208, or in R. Hensch, Ullmann's Encyclopedia of Industrial Chemistry, 5th Edition, 1987, Vol. A9, pages 297 to 339, in E. W. Flick, Industrial Surfactants, Noyes Publication, Park Ridge, 1988, or in M. R. Porter, Handbook of Surfactants, Chapmann & Hall, New York 1991.

Emulsifiers whose HLB value is >8 are also particularly suitable. HLB is the abbreviation for hydrophilic lipophilic balance of the emulsifier and relates to a balancing of the effect of the hydrophilic and of the lipophilic groups of the emulsifiers. A definition of the term appears, for example, in Das Atlas HLB-System, Atlas Chemie GmbH, EC 10 G July 1971, and in Classification of Surface Active Agents by HLB, W. C. Griffin, Journal of the Society of Cosmetic Chemists, 1 (1949), 311.

As a rule, the amount of dispersant used is from 0.5 to 20, preferably from 0.5 to 10, particularly preferably from 0.5 to 5, % by weight, based on the monomers to be subjected to free radical polymerization. However, the direct products according to the invention also include aqueous emulsions of self-emulsifying polymers, ie. of polymers which have ionic groups which, owing to the repulsion of charges of the same sign, are capable of having a stabilizing effect. The direct products according to the invention preferably exhibit anionic stabilization (in particular anionic dispersants). However, cationic compounds may also be used, for example fatty amines, quaternary ammonium compounds or quaternized pyridines, morpholines or imidazolines.

The novel process can be carried out under reduced pressure, atmospheric pressure (1 atm) or superatmospheric pressure. Typically, the pressure in the novel free radical aqueous emulsion polymerization is from 0.8 to 15 atm. Polymerization is preferably effected at atmospheric pressure.

The novel free radical aqueous emulsion polymerization is advantageously carried out under an inert gas atmosphere and with stirring. The polymerization temperature is as a rule from 0 to 160° C., frequently from 40 to 160° C., preferably from 50 to 120° C.

If required, the molecular weight of the novel emulsion polymer can be reduced by the presence of molecular weight regulators during the novel free radical aqueous emulsion polymerization. Suitable molecular weight regulators are, for example, halogen compounds, such as tetrachloromethane, chloroform or bromotrichloromethane, allyl compounds, such as allyl alcohol or 2,5-di-phenyl-1-hexene, aldehydes, formic acid or formic esters. Particularly suitable molecular weight regulators are compounds containing sulfur in chemically bonded form, such as inorganic bisulfites, sulfites, disulfites and dithionites or organic sulfides, disulfides, polysulfides, sulfoxides, sulfones and mercapto compounds. Mercapto alcohols, mercaptocarboxylic acids and mercaptoalkenes having 2 to 30 carbon atoms in the molecule, such as 2-mercaptoethanol, 1,3-mercaptopropanol, 3-mercaptopropane-1,2-diol, 1,4- mercaptobutanol, cysteine, mercaptoacetic acid, 3-mercaptopropionic acid, mercaptosuccinic acid, n-butyl mercaptan, n-hexyl mercaptan, n-dodecyl mercaptan or tert-dodecyl mercaptan, are preferably used. If the molecular weight regulators are present, they are used in amounts from 0.1 to 15, preferably from 0.1 to 5, % by weight, based on the monomers to be polymerized.

After their actual preparation, the aqueous copolymer emulsions obtainable according to the invention can be subjected to further process steps, for example in order to reduce the content of undesirable impurities. Such process steps may be, for example, postpolymerization processes, steam treatments, partially distilling off the aqueous phase or stripping processes. However, they may also be subjected to other treatment steps, such as filtration, drying or coagulation processes.

Conventional assistants, such as complexing agents, antifoams, preservatives, corrosion inhibitors, free radical acceptors, antioxidants, acids or bases, can of course be added to the aqueous copolymer emulsions obtainable according to the invention.

The novel aqueous polymer emulsions are obtainable, for example, by initially taking all components of the polymerization batch in a polymerization vessel and then heating them to the polymerization temperature. However, various components or all components may also be fed partially or wholly to the polymerization vessel in the course of the reaction, within periods which may differ from one another (feed process). The addition may be effected via spatially separated feeds or, if required, at the same point in space.

The novel aqueous polymer emulsions are advantageously obtainable by the feed process, by initially taking the total amount of free radical polymerization initiator in water, heating the initially taken mixture to the polymerization temperature and then continuously running an aqueous emulsion containing the monomers to be polymerized, the organic solvent, water and the total amount of dispersant into the polymerization vessel at the rate of consumption, while maintaining the polymerization (temperature). However, it is of course also possible, for example, to run in the polymerization initiator, for example as an aqueous solution, synchronously with the monomers by a spatially separated feed. Furthermore, some of the dispersant may be initially taken in the polymerization vessel.

All that is essential to the invention is that the polymerization of at least a part of the monomers to be polymerized is carried out in a dispersing medium which also comprises an organic solvent phase in addition to an aqueous phase, the amount of solvent being >20% by weight, based on the total amount of the monomers to be polymerized. Preferably, the polymerization of at least 50 or at least 75 or 100% by weight of the total amount of monomers to be polymerized is carried out in a dispersing medium which consists of an aqueous phase and of such an organic solvent phase.

The novel aqueous polymer emulsions are suitable in general for thickening aqueous systems, in particular for thickening oil-in-water emulsions, as used, for example, for cosmetic purposes. Suitable oils are in particular liquid paraffins, ester oils (eg. isopropyl myristate) and natural oils, such as sunflower oil, peanut oil or jojoba oil. Such oil-in-water emulsions usually contain from 0.2 to 10% by weight, based on their total weight, of added novel aqueous emulsion polymer.

EXAMPLES

Preparation of various novel aqueous polymer emulsions Di and of comparative emulsions VDi D1: 485 g of water and 0.75 g of sodium peroxodisulfate were initially taken in a polymerization vessel and heated to 80° C. while stirring and under a gentle stream of nitrogen. A stirred feed comprising 114 g of water, 5.5 g of the sodium salt of the sulfuric half-ester of ethoxylated lauryl alcohol (degree of ethoxylation: 2, emulsifier 1), 105 g of methacrylic acid, 30 g of ethyl acrylate and 75 g of ethyl acetate was then fed continuously to the polymerization vessel in the course of 3 hours while maintaining the temperature of 80° C. After the end of the addition, stirring was continued for a further 3 hours while maintaining the temperature of 80° C. The ethyl acetate was then separated off by distillation. An aqueous polymer emulsion which had a solids content of 21% by weight was obtained. The weight average diameter of the dispersed polymer particles was 357 nm (scattered light measurement).

VD1: As for D1, but without the addition of ethyl acetate. The polymerization batch coagulated during the polymerization.

D2: 485 g of water and 0.75 g of sodium peroxodisulfate were initially taken in a polymerization vessel and heated to 80° C. while stirring and under a gentle stream of nitrogen. A stirred feed comprising 114 g of water, 5.5 g of emulsifier 1, 120 g of methacrylic acid, 30 g of ethyl acrylate, 1.5 g of sodium styrenesulfonate and 75 g of ethyl acetate was then fed continuously to the polymerization vessel in the course of 3 hours while maintaining the temperature of 80° C. After the end of the addition, stirring was continued for a further 3 hours while maintaining the temperature of 80° C. The ethyl acetate was then separated off by distillation. An aqueous polymer emulsion which had a solids content of 21.9% by weight was obtained. The weight average diameter of the dispersed polymer particles was 377 nm (scattered light measurement).

VD2: As for D2, but without the addition of ethyl acetate. The polymer batch coagulated during the polymerization.

D3: 450 g of water and 0.80 g of sodium peroxodisulfate were initially taken in a polymerization vessel and heated to 80° C. while stirring and under a gentle stream of nitrogen. A stirred feed comprising 150 g of water, 5 g of emulsifier 1, 75 g of methacrylic acid, 75 g of styrene and 75 g of ethyl acetate was then fed continuously to the polymerization vessel in the course of 3 hours while maintaining the temperature of 80° C. After the end of the addition, stirring was continued for a further 3 hours while maintaining the temperature of 80° C. The ethyl acetate was then separated off by distillation. The aqueous polymer emulsion was then filtered through a polyamide filter net (mesh size 120 $\mu$m). An aqueous polymer emulsion which had a solids content of 21.9% by weight and showed no signs of settling out even after storage for one month was obtained. The weight average diameter of the dispersed polymer particles was 84 nm (scattered light measurement). The K value of the disperse polymer (23° C., 0.1% strength by weight solution in tetrahydrofuran) was 66.3.

The K value is a relative viscosity number which is determined similarly to DIN 53 726. It is based on the flow velocity of a pure solvent relative to that of a solution of the polymer in this solvent and characterizes the average molecular weight of the polymer. A high K value corresponds to a high average molecular weight (cf. Cellulosechemie, 13 (1932), 58–54, and Kirk-Othmer, Encyclopedia of Chemical Technology, Vol. 23, pages 967 to 968).

D3: As for D3, but without the addition of ethyl acetate. The polymerization batch partially coagulated during the polymerization. The uncoagulated part consisted of a coarse-particle suspension, which rapidly settled out.

D4: 450 g of water and 0.75 g of sodium peroxodisulfate were initially taken in a polymerization vessel and heated to 80° C. while stirring and under a gentle stream of nitrogen. A stirred feed comprising 150 g of water, 5 g of emulsifier 1, 90 g of methacrylic acid, 60 g of ethyl acrylate and 75 g of ethyl acetate was then fed continuously to the polymerization vessel in the course of 3 hours while maintaining the temperature of 80° C. After the end of the addition, stirring was continued for a further 3 hours while maintaining the temperature of 80° C. The ethyl acetate was then separated off by distillation. An aqueous polymer emulsion which had a solids content of 21% by weight was obtained. The weight average diameter of the dispersed polymer particles was 266 nm (scattered light measurement).

The K value of the disperse polymer (23° C., 1% strength by weight solution in tetrahydrofuran) was 22.3.

VD4: As for D4, but without the addition of ethyl acetate. The polymerization batch gelled.

D5: 485 g of water and 0.40 g of sodium peroxodisulfate were initially taken in a polymerization vessel and heated to 80° C. with stirring and under a gentle stream of nitrogen. A stirred feed comprising 114 g of water, 5.5 g of emulsifier 1, 30 g of methacrylic acid, 30 g of acrylic acid, 75 g of methyl acrylate, 15 g of the methacrylate of stearyl polyglycol ether (degree of ethoxylation: 25) and 150 g of ethyl acetate was then fed continuously to the polymerization vessel in the course of 3 hours while maintaining a temperature of 80° C. After the end of the addition, stirring was continued for a further hour while maintaining the temperature of 80° C. 38.2 g of a 10% strength by weight aqueous sodium hydroxide solution were then added to the reaction mixture. Ethyl acetate was then separated off by distillation in the course of 3 hours at 80° C. and under a gentle stream of nitrogen. An aqueous polymer emulsion which had a solids content of 17.7% by weight was obtained. The weight average diameter of the dispersed polymer particles was 349 nm.

VD5: As for D5, but without the addition of ethyl acetate. The polymerization batch gelled.

D6: 450 g of water and 0.3 g of sodium peroxodisulfate were initially taken in a polymerization vessel and heated to 80° C. while stirring and under a gentle stream of nitrogen. A stirred feed comprising 149 g of water, 5.5 g of emulsifier 1, 60 g of methacrylic acid, 82.5 g of ethyl acrylate, 7.5 g of the methacrylate of stearyl polyglycol ether (degree of ethoxylation: 25) and 75 g of cyclohexane were then fed continuously to the polymerization vessel in the course of 3 hours while maintaining the temperature of 80° C. After the end of the addition, stirring was continued for a further 2 hours while maintaining the temperature of 80° C. The cyclohexane was then separated off by distillation. An aqueous polymer emulsion which had a solids content of 20.1% by weight was obtained. The K value of the dispersed polymer (23° C., 0.1% strength by weight solution in tetrahydrofuran) was 99.9.

D7: As for D6, but 75 g of ethyl acetate were used as the organic solvent, instead of 75 g of cyclohexane. An aqueous polymer emulsion which had a solids content of 19.8% by weight was obtained. The K value of the dispersed polymer (23° C., 0.1% strength by weight solution in tetrahydrofuran) was 117. 100 ml of the resulting aqueous polymer emulsion diluted to a solids content of 1% by weight had a Brookfield viscosity of 18 Pas at 23° C. after the addition of 0.2 g of NaOH.

VD6: As for D6, but without the addition of cyclohexane. An aqueous polymer emulsion which had a solids content of 20% by weight was obtained. The K value of the dispersed polymer (23° C., 0.1% strength by weight solution in tetrahydrofuran) was 94.6.

VD7: 485 g of water and 0.4 g of sodium peroxodisulfate were initially taken in a polymerization vessel and heated to 80° C. while stirring and under a gentle stream of nitrogen. A stirred feed comprising 152 g of water, 5.5 g of emulsifier 1, 37.5 g of methacrylic acid, 37.5 g of acrylic acid, 60 g of methyl acrylate, 15 g of methacrylate of stearyl polyglycol ether (degree of ethoxyl-ation: 25) and 15 g of ethyl acetate was then fed continuously to the polymerization vessel in the course of 3 hours while maintaining the temperature of 80° C. After the end of the addition, stirring was continued for a further 2 hours while maintaining the temperature of 80° C. The ethyl acetate was then separated off by distillation. The aqueous polymer emulsion was then filtered through a polyamide filter net having a mesh size of 120 μm. Altogether, >15 g of coagulum were present on the filter and in the stirred vessel. The resulting filtrate was an aqueous polymer emulsion having a solids content of 16.7% by weight. The weight average particle diameter was 4 μm. The K value of the dispersed polymer (23° C., 0.1% strength by weight solution in dimethylformamide) was 211.

VD8: As for VD7, but 30 g of ethyl acetate were used instead of 15 g of ethyl acetate. The amount of polymer remaining on the filter and in the stirred vessel was 10.1 g altogether. The resulting filtrate was an aqueous polymer emulsion having a solids content of 18.4% by weight. The weight average particle diameter was 5 82 m. The K value of the dispersed polymer (23° C., 0.1% strength by weight solution in dimethylformamide) was 217.

D8: As for VD7, but 50 g of ethyl acetate were used instead of 15 g of ethyl acetate. The amount of polymer remaining on the filter and in the stirred vessel was 1.1 g altogether. The resulting filtrate was an aqueous polymer emulsion having a solids content of 19.4% by weight. The weight average particle diameter was 1.2 μm. The K value of the dispersed polymer (23° C., 0.1% strength by weight solution in dimethylformamide) was 236.

D9: As for VD7, but 75 g of ethyl acetate were used instead of 15 g of ethyl acetate. The amount of polymer remaining on the filter and in the stirred vessel was 1.5 g altogether. The resulting filtrate was an aqueous polymer emulsion having a solids content of 19.1% by weight. The weight average particle diameter was 0.790 μm. The K value of the dispersed polymer (23° C., 0.1% strength by weight solution in dimethylformamide) was 241

D10: 485 g of water and 0.4 g of sodium peroxodisulfate were initially taken in a polymerization vessel and heated to 80° C. while stirring and under a gentle stream of nitrogen. A stirred feed comprising 160 g of water, 5.5 g of emulsifier 1, 45 g of methacrylic acid, 45 g of acrylic acid, 45 g of methyl acrylate, 15 g of the methacrylate of stearyl polyglycol ether (degree of ethoxylation: 25) and 60 g of ethyl acetate was then fed continuously to the polymerization vessel in the course of 3 hours while maintaining the temperature of 80° C. After the end of the addition, stirring was continued for a further 2 hours while maintaining the temperature of 80° C. The ethyl acetate was then separated off by distillation. The aqueous polymer emulsion was then filtered through a polyamide filter net having a mesh size of 120 μm. The resulting filtrate was an aqueous polymer emulsion having a solids content of 19.2% by weight.

VD9: As for D10, but without the addition of ethyl acetate. The polymerization batch coagulated.

We claim:

1. An aqueous polymer emulsion prepared by free radical aqueous emulsion polymerization of a mixture of monomers which have at least one ethylenically unsaturated group and are capable of free radical polymerization, said monomer mixture comprising:

a) from 30 to 90% by weight, based on the mixture, of monomers whose solubility in water at the chosen polymerization temperature and at the chosen polymerization pressure is ≧5% by weight, based on the amount of water;

b) from 10 to 70% by weight, based on the mixture, of monomers whose solubility in water at the chosen polymerization temperature and at the chosen polymerization pressure is <5% by weight, based on the amount of water;

at least a part of the free radical aqueous emulsion polymerization being carried out in an aqueous dispersing medium which, in addition to water, comprises an organic solvent whose solubility in water at the chosen polymerization temperature and at the chosen polymerization pressure is ≦10% by weight, based on the amount of water, the amount of the organic solvent being such that it is sufficient to form a solvent phase in addition to the aqueous phase and is equal to or greater than 30% by weight, based on the total amount of monomers to be polymerized, said amount not exceeding twice the mass of water contained in the dispersing medium, said organic solvent being separated off after completion of the polymerization process.

2. An aqueous polymer emulsion as claimed in claim 1, wherein the water solubility of the organic solvent used at the chosen polymerization temperature and at the chosen polymerization pressure is ≦4% by weight, based on the amount of water.

3. An aqueous polymer emulsion as claimed in claim 1, wherein the amount of organic solvent used is from 30 to 150% by weight, based on the total amount of the monomers to be polymerized in said mixture.

4. An aqueous polymer emulsion as claimed in claim 1, wherein the amount of the monomers of subparagraph a) is from 40 to 80% by weight based on the weight of monomers in said mixture.

5. An aqueous polymer emulsion as claimed in claim 1, wherein the monomers of subparagraph a) comprise acrylic or methacrylic acid or a mixture thereof.

6. An aqueous polymer emulsion as claimed in claim 1, wherein the monomers of subparagraph a) comprise at least 50% by weight of acrylic or methacrylic acid or of a mixture thereof.

7. An aqueous polymer emulsion as claimed in claim 1, wherein the monomers of subparagraph a) comprise at least one surfactant monomer.

8. An aqueous polymer emulsion as claimed in claim 1, wherein the monomers of subparagraph a) comprise at least one monomer of the formula

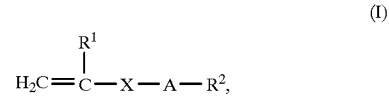

where
$R^1$ is H or $CH_3$,
X is COO, CONH, COO—CH(OH)—$CH_2$, COO—$CH_2$—CH(OH) or $CH_2$,
A is $-(CH_2CHYO)_n-$, where Y is H, $CH_3$ or $C_2H_5$ and n is from 2 to 100, and
$R^2$ is H or $C_1$–$C_{30}$-alkyl.

9. An aqueous polymer emulsion as claimed in claim 1, where the monomers of subparagraph b) comprise only those monomers whose solubility in water at the chosen polymerization pressure and at the chosen polymerization temperature is equal to or less than the corresponding solubility of methyl acrylate.

10. An aqueous polymer emulsion as claimed in claim 1, where the polymerization temperature at which the monomers are polymerized is from 40 to 160° C.

11. A method of using an aqueous polymer emulsion as claimed in claim 1 for thickening aqueous systems comprising adding said aqueous polymer emulsion to an aqueous composition.

12. A method of using an aqueous polymer emulsion as claimed in claim 11 wherein said aqueous composition is an oil-in-water emulsion.

13. An oil-in-water emulsion containing as a thickener an aqueous polymer emulsion as claimed in claim 1.

14. A process for the preparation of an aqueous polymer emulsion comprising polymerizing under free radical aqueous emulsion polymerization conditions, a mixture of monomers comprising:

a) from 30 to 90% by weight, based on the mixture, of monomers whose solubility in water at the chosen polymerization temperature and at the chosen polymerization pressure is ≧5% by weight, based on the amount of water;

b) from 10 to 70% by weight, based on the mixture, of monomers whose solubility in water at the chosen polymerization temperature and at the chosen polymerization pressure is <5% by weight, based on the amount of water;

at least a part of the free radical aqueous emulsion polymerization being carried out in an aqueous dispersing medium which, in addition to water, comprises an organic solvent whose solubility in water at the chosen polymerization temperature and at the chosen polymerization pressure is ≦10% by weight, based on the amount of water, the amount of the organic solvent being such that it is sufficient to form a solvent phase in addition to the aqueous phase and is equal to or greater than 30% by weight, based on the total amount of monomers to be polymerized, said amount not exceeding twice the mass of water contained in the dispersing medium said organic solvent being separated off after completion of the polymerization process.

15. Process for the preparation of an aqueous polymer emulsion as claimed in claim 14, wherein the total amount of free radical polymerization initiator is initially taken in water, the initially taken mixture is heated to the polymerization temperature and an aqueous emulsion comprising the monomers to be polymerized, the organic solvent and water is then run continuously into the polymerization vessel, while maintaining the polymerization temperature.

16. A process for the preparation of an aqueous polymer emulsion, as set forth in claim 14 or 15 wherein the organic solvent used is separated off by distillation after completion of the polymerization process.

17. An aqueous polymer emulsion, produced by a process as claimed in claim 16.

18. A method of thickening an aqueous system comprising adding to said system an amount of the aqueous polymer emulsion of claim 17 sufficient to achieve the desired thickening.

19. An oil-in-water emulsion containing an aqueous polymer emulsion as claimed in claim 17.

20. An aqueous polymer emulsion as claimed in claim 1 wherein the amount of organic solvent used is from 40 to 100% by weight, based on the total amount of monomers to be polymerized in said mixture.

21. An aqueous polymer emulsion as claimed in claim 1, wherein monomers of said monomer mixture are fed to the polymerization vessel during the course of the reaction.

22. The aqueous polymer emulsion of claim 1 wherein;

said monomers a) are selected from the group consisting of acrylic acid, methacrylic acid, the methacrylate of stearyl polyglycol ether having from 15 to 35 ethylene oxide units in the polyglycol ether group and mixtures thereof, said monomers b) are selected from the group consisting of styrene, vinyl esters of alkanecarboxylic acids of 2 to 30 carbon atoms, alkyl acrylates and alkyl methacrylates wherein the alkyl group of said acrylates and methacrylates has 1 to 10 carbon atoms.

23. An aqueous polymer emulsion as set forth in claim 22 wherein said solvent is ethyl acetate.

24. An aqueous polymer emulsion as claimed in claim 1 wherein the amount of organic solvent used is from 10 to 20% by weight, based on the amount of a total dispersing medium.

25. A method as set forth in claim 12 wherein said aqueous composition is an oil-in-water emulsion of an oil selected from the group consisting of liquid paraffin, isopropyl myristate, sunflower oil, peanut oil and jojoba oil.

26. A process as set forth in claim 15 wherein the aqueous free radical polymerization of monomers is carried out in the presence of a dispersant.

27. A process as set forth in claim 15 wherein said polymerization is carried out in the presence of a dispersant and the total amount of said dispersant is included in said aqueous emulsion run into said polymerization vessel.

28. A process as set forth in claim 14 wherein the solubility of the monomers b) is such that the total amount of monomers b) involved in the process is not completely soluble in the aqueous part of the dispersing medium at the temperature and pressure of the polymerization.

29. A process as set forth in claim 14 wherein the water solubility of the organic solvent is $\leq 4\%$ by weight, based on the amount of water.

* * * * *